March 25, 1958  G. BRAND  2,827,976
VEHICLE POWER-STEERING ATTACHMENT
Filed July 27, 1955  2 Sheets-Sheet 1
FIG.2.
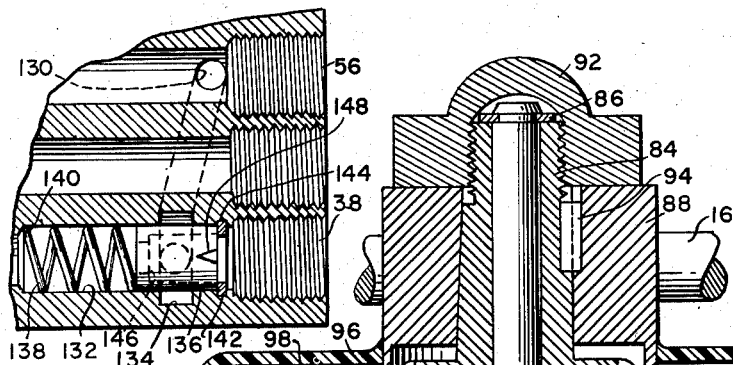
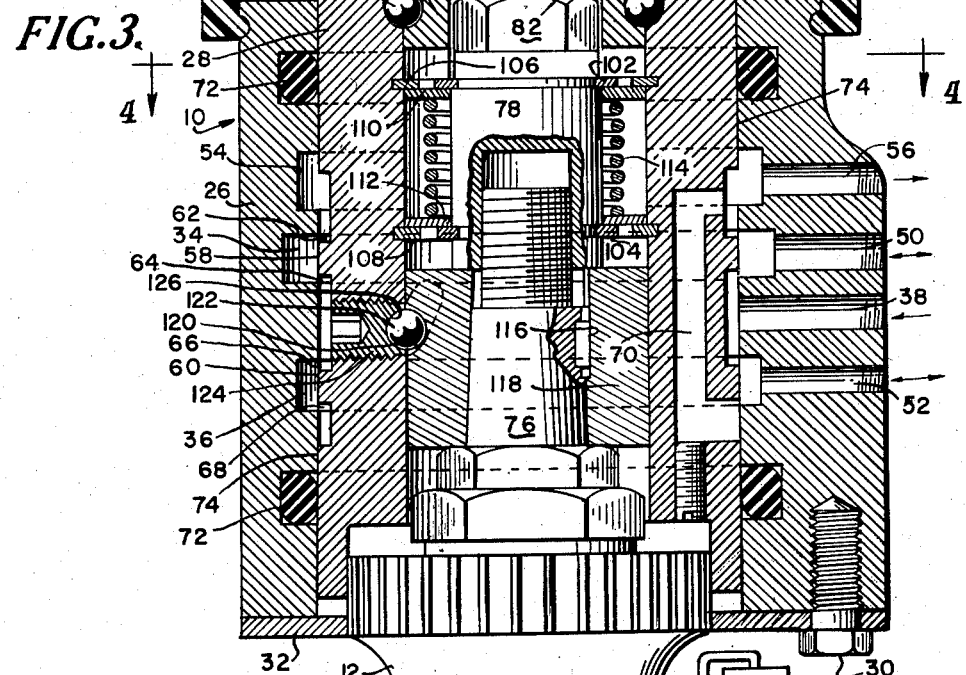
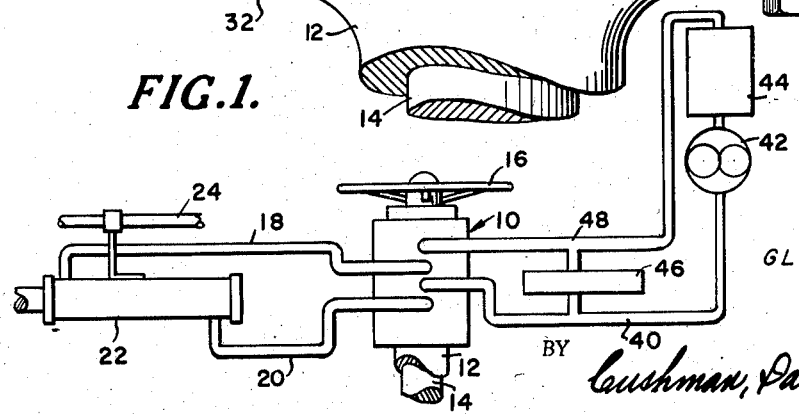
FIG.3.
FIG.1.
INVENTOR
GLEN BRAND
BY
Cushman, Darby & Cushman
ATTORNEYS March 25, 1958 G. BRAND 2,827,976
VEHICLE POWER-STEERING ATTACHMENT
Filed July 27, 1955 2 Sheets-Sheet 2

INVENTOR
GLEN BRAND

BY Cushman, Darby and Cushman
ATTORNEY

United States Patent Office 2,827,976
Patented Mar. 25, 1958

2,827,976

VEHICLE POWER-STEERING ATTACHMENT

Glen Brand, Omaha, Nebr., assignor to Lion Products Company, Omaha, Nebr., a corporation of Nebraska Application July 27, 1955, Serial No. 524,788

10 Claims. (Cl. 180—79.2)

This invention relates to a power-steering mechanism, and more particularly to control valves and mountings therefor for hydraulic power-steering mechanisms.

While hydraulic power-steering mechanisms for vehicles are well known, control valve arrangements for such mechanisms usually are relatively complicated and involve a specially designed steering apparatus with consequent increase in the cost of manufacture, assembly, and maintenance of the entire mechanism. An improved control valve and mounting attachment for converting a vehicle to power-steering are illustrated and described in my co-pending application, Serial No. 421,291, filed April 6, 1954, and this invention constitutes an improvement thereon.

The control valve illustrated in that application consists essentially of a spool valve having a casing fixed to the free end of a steering column and enclosing a tubular spool which, in turn, encloses a steering shaft projecting upwardly out of the steering column. The spool is engaged with the steering shaft by a camming arrangement which results in axial movement of the spool upon relative rotation between the spool and the shaft. Therefore, rotation of the spool when the shaft is stationary, results in its being shifted longitudinally to a position which alters the flow of pressure fluid to and from a fluid motor which is mechanically engaged with the shaft, or with a steering member engaged with the shaft. In that invention, a conventional steering wheel is fixed to a post projecting upwardly from and fixed to the top of the spool, so that the steering wheel and spool will experience identical rotational and longitudinal movements.

While this vehicle power-steering mechanism has been quite successful, it has one inherent disadvantage which is obviated by the present invention. That disadvantage stems from the fact that an axial force exerted on the steering wheel, and hence upon the valve spool, can cause the valve spool to shift longitudinally and thus energize the fluid motor. This can occur when the vehicle is moving over a rough terrain and when the vehicle operator is accidently thrown forward or backward relative to the steering wheel. Such an accidental axial shifting of the steering wheel will result in an inadvertent and unexpected energization of the fluid motor, and hence an unexpected change in position of the wheels steered thereby, and this is, of course, somewhat undesirable.

It is therefore an object of this invention to provide an improved power-steering attachment which may be connected to a conventional mechanical steering assembly and which does not change the movement or function of any of the conventional elements thereof.

It is another object of this invention to provide an improved power-steering mechanism for attachment to a motor vehicle having an axially fixed steering shaft and steering housing, and which does not impart any motion to the steering shaft other than a rotational motion.

It is another object of this invention to provide an improved power-steering mechanism including a control valve which may be secured to the free end of a conventional steering housing and which provides a mounting for a conventional steering wheel.

It is another object of this invention to provide an improved power-steering attachment which will be completely unaffected by any axial forces or pressures applied to the steering wheel.

It is a further object of this invention to provide an improved power-steering attachment for a vehicle that can be manufactured, installed, and maintained at a minimum of expense, and when installed takes up a minimum of space in the vehicle.

These and other objects and advantages of the invention will be apparent from the following description and accompanying drawings in which:

Figure 1 is a schematic view of a hydraulic system of a power-steering mechanism embodying this invention;

Figure 2 is a vertical sectional view of a power-steering attachment embodying this invention and showing the same mounted on a vehicle;

Figure 3 is an enlarged fragmentary view of a portion of Figure 2, illustrating a modification of this invention.

Figure 4:
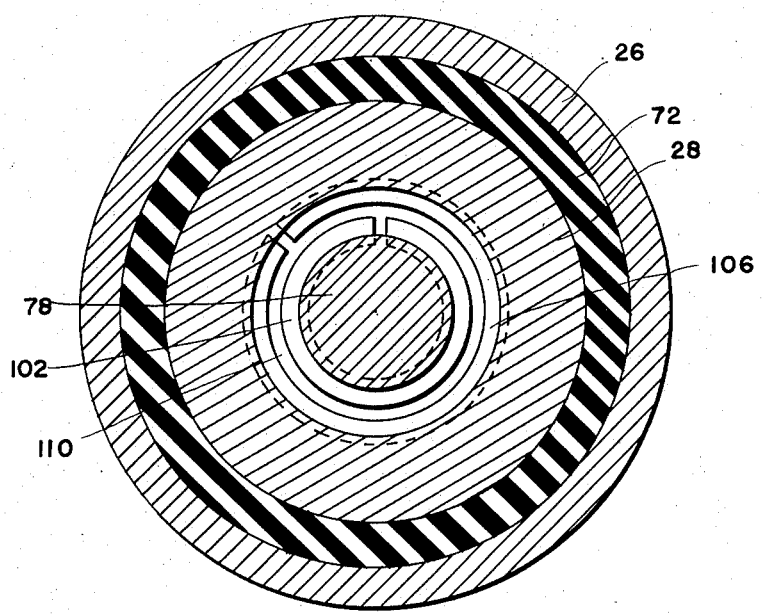
Figure 4 is a horizontal sectional view taken along lines 4—4 of Figure 2.

Referring to the schematic diagram illustrated in Figure 1, it will be seen that a control valve attachment 10 embodying this invention is mounted directly on the free ends of a conventional motor vehicle fixed steering column or housing 12 and a steering shaft 14 enclosed therein, and has a steering wheel 16 connected directly to the attachment. Thus, the control valve attachment is located directly below the steering wheel. The attachment is installed by replacing a conventional steering wheel with the control valve attachment and then mounting the wheel on the latter. As will be described in detail hereinafter, rotational manipulation of the steering wheel 16 results in the creation of fluid pressure differentials in the control conduits 18 and 20 leading from the control attachment to a conventional reciprocating fluid motor 22 connected to operate a link 24 connected with a steering member, i. e., the wheel (not shown).

Referring more particularly to Figure 2, it will be seen that the control valve attachment 10 is of the spool type having a cylindrically bored casing 26 and a tubular valve spool 28 reciprocable therein. The lower end of the casing 26 is fixed, as by bolts 30, to a collar 32 which is force-fitted to the splined end of the steering column 12, although it may be fixed thereto by any suitable means. The interior of the valve casing 26 is provided with a pair of axially spaced circumferential grooves 34 and 36. A radial casing port 38 for the supply of fluid under pressure, via a conduit 40 (Figure 1) from an appropriate source, is located substantially midway between the casing grooves 34 and 36. Such a source may comprise a pump 42 receiving fluid from a sump 44 and having a pressure relief valve 46 connected between the supply conduit 40 and a return conduit 48. Flexible conduits 18 and 20, leading to the fluid motor 22, are connected respectively to radial casing ports 50 and 52, which open to the bottom of the grooves 34 and 36, respectively. Above the casing groove 34, there is another interior circumferential groove 54 having a radial casing port 56 for the return flow of the pressure fluid through the return line 48, as will be later described.

The valve spool 28 has a pair of axially spaced lands 58 and 60, opposed to the casing grooves 34 and 36, respectively, when the spool is in its neutral or centered position shown in Figure 2. The lands are narrower than their corresponding grooves to provide four variable annular fluid restrictions 62, 64, 66, 68, between the two edges of the lands and the corresponding edges of the grooves. When the valve spool 28 is in its neutral position, all of the restrictions 62, 64, 66, 68, are of equal value. The valve spool 28 is provided with one or more longitudinal passageways 70 which, at their upper ends, open to the surface of the spool above the upper land 58 and, at their lower ends, open to the surface of the spool below the lower land 60. As shown in Figure 2, the opposite ends of the casing 26 are sealed against leakage by O-rings 72 disposed in interior circumferential grooves in the valve casing and engaging against end lands 74 on the valve spool 28.

The valve spool is tubular and encloses a steering shaft post 76 on the upper end of the steering shaft 14. This post 76 is usually tapered, as shown, and terminates in an upper threaded portion for the reception of a nut. In accordance with this invention, the usual cap nut is replaced by a special steering shaft extension 78 having a coaxial threaded socket in its lower end for reception of the steering post threaded portion. The upper end of the shaft extension 78 terminates in a reduced shaft-like portion 80, forming an upwardly facing shoulder 82, while wrench-engageable flats may be provided on the extension below the shoulder. A steering wheel adapter 84 is rotatably mounted on the shaft-like portion 80 to bear against the shoulder 82 and is secured against axial movement by a split ring 86. The upper end of the steering wheel adapter 84 is exteriorly tapered for the reception of the hub 88 of the steering wheel 16 which is rigidly secured to the adapter by the cap nut 92 and a key 94. The lower end of the steering wheel adapter 84 has a depending skirt 96 rotatably enclosing a portion of the extension 78 and snugly but movably fitting the interior of the valve spool 28. The steering wheel adapter 84 and the valve spool 28 are anti-frictionally splined together against relative rotation, but for relative longitudinal movement, by balls 98 fitting one or more pairs of opposed longitudinal grooves in the opposed surfaces of the spool and the steering wheel adapter.

The steering wheel hub 88 has a depending rim 100 which extends to a position just above the upper end of the tubular valve spool 28 to form a stop which will serve to prevent a displacement of the balls 98 from their grooves when the spool is in its lowermost position, as will be discussed hereinafter. It will be seen that the collar 32 of the steering shaft housing 12 will act as a positive stop to limit the downward movement of the valve spool 28, but it is within the contemplation of this invention that any other suitable stop means might be utilized in the alternative.

Inasmuch as the steering wheel 16 is securely attached to the steering wheel adapter 84, any rotational movement of the steering wheel will be transmitted by means of the balls 98 to the valve spool 28. As the steering wheel adapter 84 is journaled on the shaft-like portion 80, rotational movement of the steering wheel 16 will not directly affect the shaft extension 78 or the steering shaft 14. While the steering wheel adapter 84 is here shown as having a steering wheel 16 secured thereto, it should be clear that the upper portion of the steering wheel adapter can be enlarged so that it acts as a control member, or, in the alternative, some other type steering device can be secured thereto.

The shaft extension 78 is provided with a pair of axially spaced split rings 102 and 104, engaged in corresponding circumferential grooves formed in the exterior circumference of the shaft extension. The interior of the valve spool also has a pair of axially spaced split rings 106 and 108, engaged in corresponding interior circumferential grooves in the interior circumference of valve spool 28. When the spool is in the neutral position illustrated in Figure 2, split rings 102 and 106, and split rings 104 and 108, respectively, are disposed opposite to, and radially spaced from, one another. Bearing against the lower faces of the split rings 102 and 106, and the upper faces of split rings 104 and 108, when the valve spool is in its neutral position, are a pair of loosely fitting washers 110 and 112, respectively. Interposed between the washers 110 and 112 is a compression coil spring 114. It will be seen that relative longitudinal movement between the valve spool 28 and the shaft extension 78 will cause one of the washers to move longitudinally of the shaft extension and thus compress coil spring 114. It therefore follows that spring 114 serves to maintain the valve spool 28 against movement from the neutral position shown in Figure 2, except when the bias of the spring is overcome by some other force. While the spring 114 is here illustrated as being biased against split rings projecting from the interior surface of the spool 28 and the exterior surface of the shaft extension 78, any abutment means, such as shoulders formed to replace the split rings, may be used.

From the construction shown thus far, it will be seen that hydraulic fluid supplied from the casing port 38 is divided into two paths of flow through the valve to the return flow casing port 56. One flow path includes the restriction 64, the groove 34, the restriction 62, and the groove 54. The other flow path includes restriction 66, the groove 36, restriction 68, passageways 70, and the groove 54. It thus will be seen that when the valve is in its neutral position, incoming pressure fluid will be divided substantially equally between the two aforementioned flow paths so that the pressures in the two grooves 34 and 36 are substantially the same. Thus, the pressures in the two flexible conduits 18 and 20, and consequently on opposite sides of the fluid motor 22, are substantially equal. Hence, the motor is stationary.

If the spool is moved axially relative to the casing 26, and thus to the steering shaft 14, the aforementioned fluid restrictions 62, 64, 66, 68, will be varied in a manner so that the pressures in the grooves 34 and 36 will be different. For example, if the spool is moved upward relative to the casing, the fluid restriction 64 will be increased and the restriction 62 will be decreased, the fluid restriction 68 will be increased and the restriction 66 will be decreased. Thus, the pressure of the fluid in the groove 34 will increase, while the pressure of the fluid in the groove 36 will decrease, effecting differential pressures on opposite sides of the fluid motor 22 so that it will move a mechanical link 24 of the steering assembly (not shown).

Axial shifting of the spool 28 relative to the casing 26, in accordance with the rotational movement of the steering wheel 16, is accomplished by the following mechanism. As discussed above, the valve spool 28 is tubular and encloses the steering post 76 on the upper end of the steering shaft 14. Fitting and rigidly affixed on the steering post 76 by the shaft extension 78 and a key 116, is what may be termed a steering shaft adapter 118, which consists of a bushing-like member having a cylindrical exterior surface provided with one or more relatively short helical cam grooves 120, semi-circular in radial section. Extending into the cam grooves 120 from the valve spool 28, are cam groove followers 122, each in the form of a ball. The ball 122 is held in position by a plug 124 threaded through the side wall of the tubular valve spool 28 and having a hemispherical cavity 126 on its inner end to receive the ball.

It thus will be seen that upon rotation of the valve spool 28 corresponding to the steering movements of the steering wheel 16, the ball 122 will ride within the cam groove 120 and thus will cam the spool in either an upward or downward direction, depending upon the direction of selective rotation of the steering wheel. The longitudinal movement of the valve spool 28 will, as has been explained hereinbefore, effect a differential pressure in the fluid motor 22 to thereby move the mechanical linkage 24 in a direction corresponding to that of the steering movement of the steering wheel 16.

As the steering shaft 14 is left in its ordinary mechanical engagement with the steering assembly, this construction embodies a follow-up mechanism. When the steering wheel 16 is moved through a given arc, and the mechanical linkage moves a corresponding distance, the latter will stop, because the movement of the linkage effects a corresponding movement of the steering shaft 14 and the steering shaft adapter 118 which, by interengagement of the cam follower 122, will shift the valve spool 28 axially back to its neutral position. Accordingly, the fluid motor 22 and the mechanical linkage 24 move only through a distance dictated by a corresponding movement of the steering wheel.

The casing 26 and the spool 28 may be enclosed by any suitable cover, but in a preferred embodiment of this invention, a neoprene cover 128 is resiliently fitted into an exterior groove in the casing to grip the latter and extends over the valve casing and the spool to snugly engage with the outer periphery of the steering wheel hub 88.

Pressure fluid for a vehicle power-steering mechanism is usually supplied by a variable flow pump, i. e., flow varies with speed of operation, driven by the vehicle engine. Constant volume or constant flow pumps are relatively expensive, but it will be seen that when using a variable flow pump as a source of pressure, the speed of reaction of the power-steering mechanism will vary substantially directly with the speed of the vehicle, a somewhat undesirable situation. A simple modification of this invention, shown in Figure 3, will correct the foregoing difficulty, however, and provide an arrangement whereby the power-steering motor will move at substantially the same speed regardless of the engine or vehicle speed.

Referring to Figure 3, it will be seen that the pressure fluid supply port 38 and the fluid return port 56 are joined by a by-pass passage 130 cored into the casting of the casing 26. The pressure fluid inlet port 38 has a counterbore 132 provided with an interior circumferential groove 134. The counterbore is precision honed and then provided with a closely fitting flow-regulating sleeve, or tubular piston 136. The piston 136 is biased outwardly of the casing by a compression coil spring 138 interposed between the piston and a shoulder 140 formed by the inner end of the counterbore 132. Outward movement of the piston 136 is limited by a split ring 142, fitted within an interior circumferential groove 144, in the counterbore, to normally position the piston so that it covers the circumferential groove 134 and closes communication between the port 38 and the passage 130. Adjacent its inner end, the piston is provided with a coaxial flow restricting orifice 146, while the outer rim of the piston is provided with a flow-regulating substantially V-shaped notch 148.

When the piston is in its normal position, as illustrated, it serves to block communication between the inlet port and the passage leading to the outlet port. Therefore, all fluid flow up to a certain volume will pass through the small orifice 146 in the end of the piston 136. When the flow increases above a certain volume, the pressure drop on the inner side of the orifice 146 will cause an unbalanced force to act on the piston and urge the latter inwardly against the force of the spring 138. As the piston moves inwardly, the notch 148 will overlap the outer edge of the circumferential groove 134 and allow more and more pressure fluid to escape to the outlet port 56 through the passage 130. Hence, there is an automatic by-passing of all flow in excess of a predetermined rate for operating the steering motor 22. As the volume of flow through the inlet port decreases, the spring 138 pushes the piston 136 back to its normal position, thus again blocking the flow of fluid into the groove 134 and the by-pass passage 130. It will be seen therefore that even if the source of fluid pressure delivers a variable flow, the rate of flow to the fluid motor will remain constant so that the power-steering motor 22 will always move at substantially the same speed.

While the casing ports 38, 50, 52, and 56 are here illustrated as vertically aligned, it is within the contemplation of this invention that they enter the casing at any point that may be most convenient. For example, casing ports 38 and 50 may be on one side of the casing, and casing ports 52 and 56 may be on the other.

Having described only a typical preferred form and application of my invention, I do not wish to be limited or restricted to specific details herein set forth, but wish to reserve to myself any variations or modifications that may appear to those skilled in the art and falling within the scope of the following claims.

I claim:

1. In a power-steering mechanism mounted upon a vehicle having a fluid motor and a manually-operable steering shaft fixed against axial movement, the combination comprising: a spool valve coaxial with and adjacent one end of said shaft for controlling the admission and exhaust of pressure fluid to and from the motor, said valve having a casing element and a reciprocable valve spool element therein; means detachably connecting one of said elements to said shaft for relative axial movement on relative rotary movement; means detachably and rigidly connecting the other of said elements to a fixed member of the vehicle; a steering wheel coaxially connected to the steering shaft against relative axial movement but for relative rotary movement therebetween; and a connection between said wheel and the said one element for effecting rotary movement of the latter by said wheel while permitting relative longitudinal movement therebetween.

2. In a vehicle power-steering mechanism having a fluid pressure motor, a steering housing, and a steering shaft therein terminating in a steering post projecting out of the housing, the combination comprising: a spool valve coaxial with the post for controlling the admission and exhaust of pressure fluid to and from the motor, said valve having a casing and a hollow reciprocable valve spool therein enclosing the steering post; means rigidly secured to the post and having an exterior helical cam groove therein, a cam groove follower secured to said spool and projecting radially inwardly thereof into said groove; means detachably and rigidly connecting said casing to the housing; a steering wheel; means coaxially journaling said wheel relative to the post against relative longitudinal movement therebetween; and means connecting said wheel to said valve spool against relative rotation therebetween but for relative longitudinal movement therebetween.

3. A power-steering mechanism control valve attachment for a vehicle having a steering housing and a steering post projecting from one end thereof comprising: a ported tubular valve casing; means for rigidly and detachably securing one end of said casing to the steering housing one end; a tubular valve spool reciprocable in said casing and adapted to enclose the post; a steering post adapter securable to the post and having an exterior helical cam groove; a cam groove follower projecting radially inwardly from said spool and into said groove; a steering shaft extension securable coaxially to said post; a steering wheel adapter coaxially journaled on one end of said extension against relative longitudinal movement therebetween; and means connecting said steering wheel adapter to said valve spool against relative rotary movement but for relative longitudinal movement therebetween.

4. The structure defined in claim 3, including means defining two longitudinally spaced pairs of radially spaced coaxial circumferential abutment surfaces on the opposed surfaces of the shaft extension and the valve spool; a pair of washers radially bridging the longitudinally opposed faces of each of said pairs; and a coil compression spring interposed between said washers for urging the valve spool into a neutral position in the casing.

5. The structure defined in claim 3, including an inlet port and an outlet port in the casing; a by-pass passage in the casing connecting said inlet port and said outlet port; and flow regulating means within said inlet port for diverting the excess fluid, over a predetermined rate of flow through the inlet port, into said passage.

6. The structure defined in claim 3, including an inlet port and an outlet port in the casing; a circumferential groove in said inlet port; a by-pass passage in said casing connecting the bottom of said groove and said outlet port; and means for regulating the rate of fluid flow through said inlet port to the interior of the casing comprising: a tubular piston axially slidably disposed in said inlet port, said piston having a length greater than the width of the circumferential groove; a compression spring biasing said piston to a position closing the circumferential groove; and a restriction within said piston defining a metering orifice for creating an unbalanced axial force on said piston to axially shift the latter into a position opening the circumferential groove when the inlet port is supplied with fluid in excess of a predetermined flow rate.

7. A power-steering control valve attachment for a motor vehicle having a steering shaft fixed against axial movement and mechanically engaged with a steered element operable by a fluid pressure steering motor controlled by a valve attachment, comprising: a spool valve having a casing fixedly securable to the vehicle; a hollow valve spool rotatable and reciprocable in said casing; a rotatable control member coaxial with said spool and connected thereto against relative rotation but for relative longitudinal movement therebetween; means for mounting said control member coaxially of the shaft against axial movement therebetween; and cam means located within the spool for shifting said spool longitudinally of said casing upon relative rotation between said spool and the steering shaft.

8. The structure defined in claim 7, in which the spool is hollow for reception of one end of the shaft and in which the control member mounting means comprises a steering shaft extension coaxially fixable to the steering shaft at one end, rotatably mounting the control member; and including a shaft adapter rigidly securable to the shaft within the spool and having an exterior helical cam groove defining a part of the cam means.

9. The structure defined in claim 8, and including a pair of axially spaced abutment means formed on the steering shaft extension; a pair of axially spaced abutment means formed on the interior of said spool in radial opposition to the extension abutment means when the spool valve is in its neutral position, a pair of axially spaced annular abutment elements freely disposed between said steering shaft extension and the interior surface of said spool, said annular abutment elements having a sufficient width to bridge a corresponding pair of radially opposed abutment means when the spool is in its neutral position; and a coil spring biased to constantly urge said annular abutment elements against at least two of said abutment means and to resiliently resist rotation of said control means and said spool element.

10. A valve for energizing and controlling a fluid motor operatively engaged with mechanism to be selectively moved, by translating the degree and direction of selective rotation of a control member into varying amounts of pressure differential in at least two fluid courses communicating with the fluid motor comprising: a casing defining a cylindrical chamber having an inlet port, an outlet port, and two control ports for fluid connection with the fluid motor; a hollow valve spool reciprocably and rotatably disposed entirely within said chamber, said spool and said casing having their opposed surfaces formed to mutually define variable-resistance fluid flow paths to inversely vary the fluid pressure in the two control ports upon axial movement of said spool; a control element mounted coaxial with said spool and fixed against axial movement relative to said casing; means engaging said control member and said spool to prevent relative rotation therebetween while permitting relative longitudinal movement therebetween; and camming means operable by relative movement of said spool and the mechanism to be selectively moved to axially shift said spool to inversely vary the pressure differential in said ports, said camming means being located within said spool.

References Cited in the file of this patent
UNITED STATES PATENTS

| | | |
|---|---|---|
| 2,710,596 | Folkerts | June 14, 1955 |
| 2,722,199 | Blanchette | Nov. 1, 1955 |
| 2,753,848 | Burton | July 10, 1956 |